350-3.78 SR

XR 3,781,830

TX 3049 W

United Sta

Vilkomerson

[11] 3,781,830

[45] Dec. 25, 1973

[54] HOLOGRAPHIC MEMORY WITH LIGHT INTENSITY COMPENSATION MEANS

[75] Inventor: David Herman Raphael Vilkomerson, Hightstown, N.J.

[73] Assignee: RCA Corporation, New York, N.Y.

[22] Filed: June 23, 1972

[21] Appl. No.: 265,555

[52] U.S. Cl. ....... 340/173 LM, 350/3.5, 340/173 LT
[51] Int. Cl. ....... G11c 13/00
[58] Field of Search ....... 340/173 LT, 173 LM

[56] References Cited

UNITED STATES PATENTS

| | | | |
|---|---|---|---|
| 3,020,534 | 2/1962 | Jones | 340/173 LM |
| 3,669,521 | 6/1972 | Tait | 340/173 LM |

*Primary Examiner*—Terrell W. Fears
*Attorney*—H. Christoffersen et al.

[57] ABSTRACT

A holographic memory is disclosed in which any one hologram in an array of holograms is illuminated by a reference beam from a respective light-emitting diode in an array of light emitting diodes. An array of photosensors is arranged to receive the "1" and "0" binary optical information signals from whichever hologram may be illuminated. Each hologram includes a recording of an extra threshold-setting bit, and an extra threshold-setting-bit photosensor is included to establish an electrical threshold distinguishing between "1" and "0" information signals despite variations in light emission from different light-emitting diodes and holograms.

1 Claim, 2 Drawing Figures

3781830
OR IN 340/173LM

PATENTED DEC 25 1973 3,781,830

HOLOGRAPHIC MEMORY WITH LIGHT INTENSITY COMPENSATION MEANS

The invention herein described was made in the course of, or under a contract or subcontact thereunder, with the Department of the Army.

BACKGROUND OF THE INVENTION

Background information is contained in a paper, "Holographic Read-Only Memories Accessed by Light-Emitting Diodes" by D.H.R. Vilkomerson, R.S. Mezrich, and D.I. Bostwick, appearing on pages 1,197–1,204 of the Proceedings of the Fall Joint Computer Conference, 1968. The described memory includes an array of holograms each made to store an optical pattern of "1" and "0" information bits. A separate light-emitting diode is provided for each hologram. When a light-emitting diode is electrically energized, the emitted light is directed as a reference beam to the corresponding hologram causing the stored information to be read out to an array of photosensors. There is one photosensor for every binary bit position in the optical patterns stored in all of the holograms. In operation, any desired one of the light-emitting diodes is energized to illuminate a corresponding hologram and project the information pattern stored therein to an array of photosensors. The resulting information bit electrical signals are amplified and made available at information output terminals.

The information stored in any one of the holograms is very quickly accessible by merely electrically energizing the corresponding light-emitting diode. The same array of photosensors is used for all of the holograms in the array. This places an impractically high requirement of uniformity on the light-emitting diodes and the holograms. That is, the amount of light representing a binary "1" received by a photosensor from one light-emitting diode and hologram should be the same as the amount of light received by the same photosensor from another light-emitting diode and hologram. If there is too much variation in light intensity, due to initial characteristics or aging, the photosensor may be unable to correctly distinguish between the light amplitude representing a binary "1" and a binary "0".

SUMMARY OF THE INVENTION

In an optical memory, each of many films or other media storing information is constructed to include a stored gain control or threshold bit. When the information stored in a selected film is read out to an array of photosensor means, the stored threshold bit is also sensed by a separate photosensor, and its output is used to make the photosensor means respond uniformly to the optical information signals, despite variations in output light from different films.

DESCRIPTION

Figure 1:
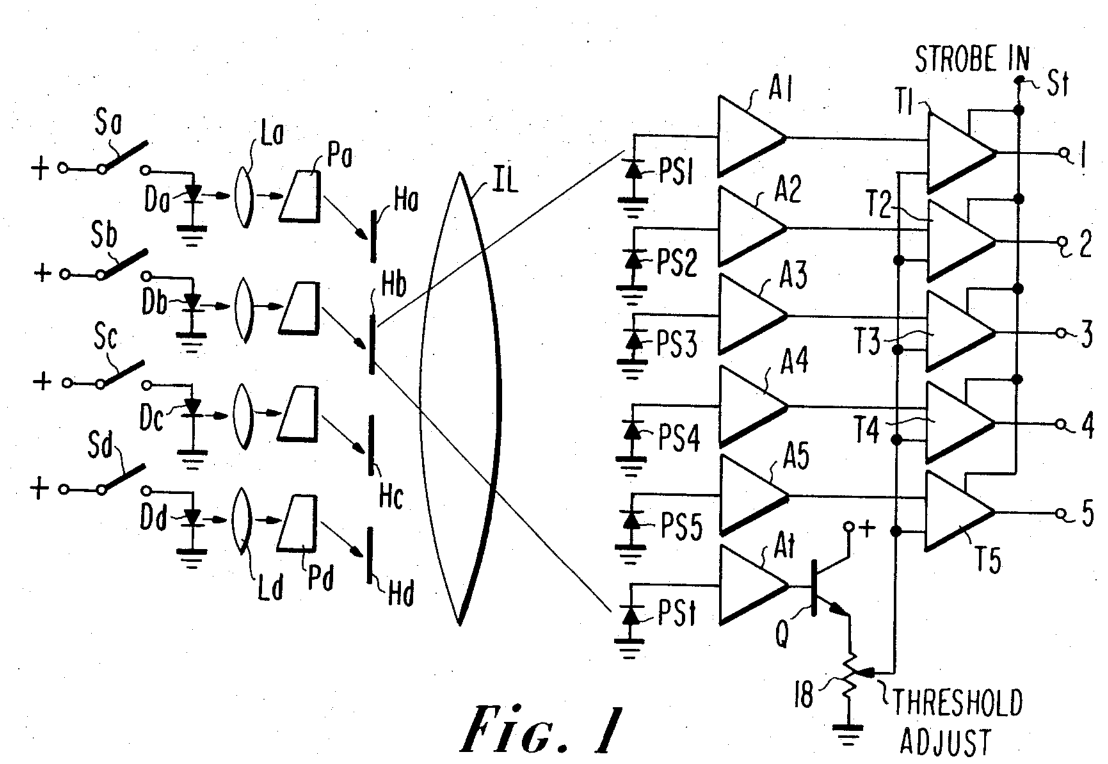
FIG. 1 is a diagram of a holographic memory system constructed according to the teachings of the invention.

Reference is now made in greater detail to FIG. 1 of the drawing wherein there is shown an array of light-emitting devices or laser diodes $D_a$ through $D_d$. While only four light-emitting diodes are shown for purposes of illustration, the actual number of diodes in a practical system may be a large number such as 1,024. The light-emitting diodes are preferably arranged in a rectangular array, any one of which may be energized by energizing one X conductor and one Y conductor of a conventional selection matrix (not shown). The light-emitting diodes $D_a$ through $D_d$ are shown, for convenience, as being connectable through respective switches $S_a$ through $S_d$ to appropriate sources of electrical energy capable of making the diodes emit light.

An array of lenses $L_a$ through $L_d$ is provided, and each is positioned to gather light emitted from a respective one of diodes $D_a$ through $D_d$. An array of prisms $P_a$ through $P_d$ is provided, and each is positioned to receive light from one of lenses $L_a$ through $L_d$ and direct the light at an acute angle to a respective one of holograms $H_a$ through $H_d$ of an array of holograms. Light is directed to the holograms at an angle such that the light functions as a reference beam. The necessary angle at which the light is directed to the holograms is determined by the angle at which a reference beam was directed to the hologram when the hologram was originally created by the interference of a reference beam and an object beam. Alternatively, the elements $H_a$ through $H_d$ may be films or other storage means having patterns of light and dark areas.

Each hologram $H_a$ through $H_d$ is constructed so that when it is illuminated by a reference beam from a respective light emitting diode $D_a$ through $D_d$, the binary information stored in the hologram passes through imaging lens IL and recreates the optical binary stored information in the plane of an array of diode photosensors $PS_1$ through $PS_5$. The number of photosensors $PS_1$ through $PS_5$ corresponds with the number of binary "1" or "0" information bits stored in each of the holograms $H_a$ through $H_d$. While only five photosensors are shown in the drawing, a much larger number of photosensors, such as 72, may be employed. The holograms $H_a$ through $H_d$ are illuminated one at a time, and the pattern of optical information bits stored in whichever hologram is illuminated is recreated, bit for bit, at the photosensors $PS_1$ through $PS_5$. That is, the photosensors are arranged in the same pattern and the same position as the pattern of optical information bits reproduced from any illuminated one of the holograms. The pattern of photosensors and information bits will normally be a rectangular array, rather than the linear array shown in FIG. 1.

Each hologram $H_a$ through $H_d$ includes, in addition to the optically recorded binary information bits, an additional threshold-determining control bit. Each threshold bit may be recorded as a spot having a light intensity equal to a desired threshold value, such as about 80 per cent of the light intensity of a "1" information bit. On the other hand, the threshold bit may be recorded with the same intensity as a "1" bit, and a potentiometer used to set an effective threshold, as will be described. The plane of the information photosensors $PS_1$ through $PS_5$ also includes an extra threshold-setting-bit photosensor $PS_t$ for receiving the optical threshold-setting-bit from any particular illuminated hologram.

Figure 2:
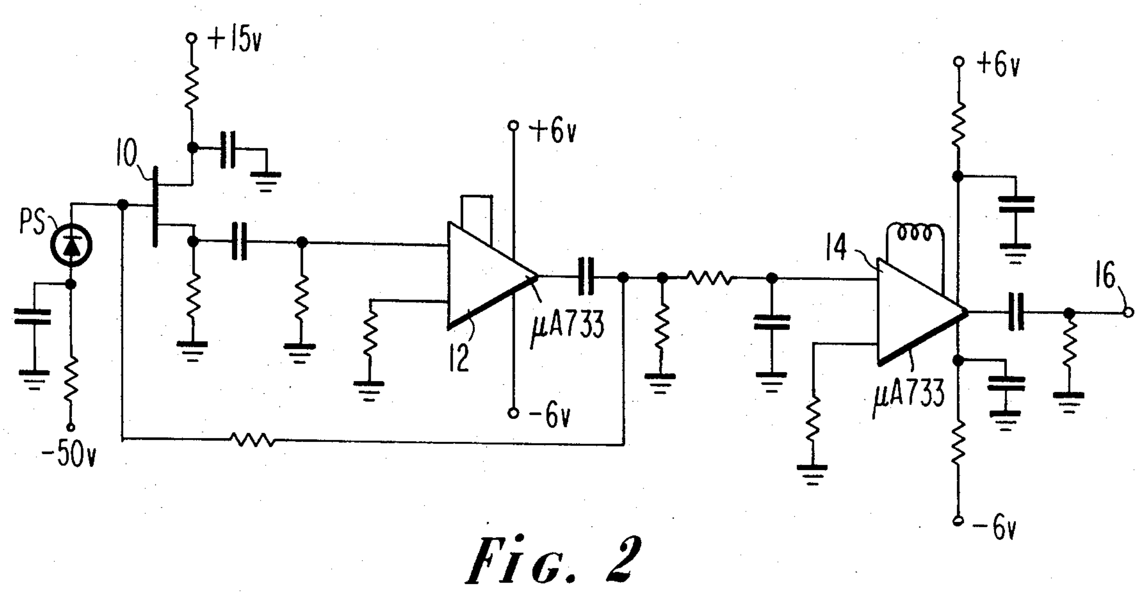
FIG. 2 is a photosensor and amplifier circuit useful in the system of FIG. 1.

The binary information-bit-sensing photosensors $PS_1$ through $PS_5$, and the threshold photosensor $PS_t$, each may be a 5,082–4,207 PIN photodiode manufactured by Hewlett-Packard, Palo Alto, California, or a SGD- 100 silicon diffused photodiode manufactured by EG & G, Inc. Boston, Massachusetts, or part of an PIN-DA (10 × 10) Shottky barrier integrated array manufactured by United Detector Technology, Inc., Santa Monica, California. The photosensors are connected to respective electrical signal amplifiers $A_1$ through $A_5$, and $A_t$. Each photosensor and amplifier circuit may be constructed in a conventional manner as shown in FIG. 2. The photosensor PS is coupled through a field effect transistor 10, and first and second operational amplifiers 12 and 14 to an amplifier output terminal 16. Each operational amplifier may, for example, be a type μA733 integrated video amplifier made by Fairchild Semiconductor, Mountain View, California.

The outputs of amplifers $A_1$ through $A_5$ are coupled through respective strobed differential comparator threshold circuits $T_1$ through $T_5$ to respective binary bit output terminals 1 through 5. Each threshold circuit $T_1$ through $T_5$ may, for example, be a linear integrated circuit differential comparator with strobe, Type SN52510 or Type SN72510, manufactured by Texas Instruments, Inc., Dallas, Texas.

The output of threshold amplifier $A_t$ is coupled through an emitter-follower transistor Q, including a threshold-adjusting potentiometer 18, to the reference signal input of all of the threshold circuits $T_1$ through $T_5$. The threshold circuits are enabled, when information signal outputs are desired, by a strobe pulse applied from terminal $S_t$ to "strobe" inputs of the threshold circuits.

Operation

In operation, one of the switches, such as switch $S_b$, is closed to energize the corresponding on $D_b$ of the light-emitting diodes to illuminate the corresponding one $H_b$ of the holograms with a reference beam. Each binary bit of the information pattern stored in the hologram $H_b$ is optically recreated at a respective photosensor $PS_1$ through $PS_5$, and the threshold bit is optically recreated at the photosensor $PS_t$. It is assumed that a "1" information bit is represented by more than a given amount of light, and a "0" information is represented by the absence of light, or less than a given amount of light. Each differential comparator threshold circuit should respond by providing either a "1"-indicating or a "0"-indicating electrical signal output. The actual light intensity in "1" optical signals at the photosensors depends on the light intensity from the particular light-emitting diode being employed, and the efficiency of the particular hologram illuminated by the diode. The intensity of light from various light-emitting diodes may vary as much as plus or minus 50 per cent, and the efficiency of the holograms may vary an equal amount. Since these two variations may be additive, the intensity of light representing a "1" bit at the photosensors may vary between a very high intensity and a low intensity comparable with the intensity of a "0"-indicating bit and optical "noise" in the system.

In order to reliably distinguish "1"-indicating bit intensities from "0"-indicating light intensities, the electrical outputs from amplifiers $A_1$ through $A_5$ are compared in threshold circuits $T_1$ through $T_5$ with a reference value determined by the particular light-emitting diode and hologram in use. That is, the threshold bit photosensor $PS_t$ receives a light intensity which is a measure of the light generation and transmission efficiency of the light-emitting diode, the lens, the prism and the hologram being used. An appropriate portion of the resulting threshold bit electrical signal from amplifier $A_t$ is transmitted by threshold adjust circuit Q, 18 as a threshold signal to the reference inputs of all of the differential comparators $T_1$ through $T_5$. The threshold can be set to any desired value by manual adjustment of potentiometer 18. All information bit signals having an amplitude greater than the reference threshold signal result in "1" output signals, and all having a lower amplitude result in "0" output signals. Therefore, the correct binary information signals are provided at output terminals 1 through 5 when light-emitting diode $D_b$ and hologram $H_b$ are used, and also when any one of the other channels *a*, *c*, and *d* is used, despite large variations in the intensity of light from the various light signal generating channels.

What is claimed is:

1. In an optical memory, an array of holograms each storing a respective pattern of "1" and "0" binary information bits, and a threshold control bit, an array of information bit photosensors equal to the number of binary information bits in each of said patterns, and a threshold bit photosensor, an array of light-emitting diodes each arranged to supply a reference beam to a respective one of said holograms and to cause an optical read-out of binary information bits to said array of information bit photosensors, and an optical read-out of said threshold bit to said threshold bit photosensor.

electrical signal output means including differential amplifiers each having a signal input coupled to a respective information photosensor, and having a threshold signal input, threshold signal means coupled from said threshold photosensor to the threshold signal input of a respective differential amplifier to establish a threshold distinguishing between "1" and "0" signal amplitudes despite variations in light emission from said light-emitting diodes and from said holograms.

* * * * *